July 28, 1953  C. A. PAPENDICK  2,646,832

CUBE CUTTING MACHINE AND CUTTER THEREFOR

Filed Feb. 4, 1952

INVENTOR.
CLARENCE A. PAPENDICK
BY *Alfred W Petchaft*
ATTORNEY

Patented July 28, 1953

2,646,832

UNITED STATES PATENT OFFICE 2,646,832

CUBE CUTTING MACHINE AND CUTTER THEREFOR

Clarence A. Papendick, Normandy, Mo.

Application February 4, 1952, Serial No. 269,750

1 Claim. (Cl. 146—117)

This invention relates in general to certain new and useful improvements in cube cutting machines and, more particularly, to an improved type of cutter adapted for use therein.

In the manufacture of various baked products, such as dog-food, it has been found necessary to cut a continuously moving baked sheet into small cubes without producing any appreciable quantity of crumbs or "fines." A machine for accomplishing this result is fully described in, and forms the subject-matter of, my recently issued United States Patent No. 2,582,154. The machine therein disclosed, although highly efficient nevertheless occasionally produces a double cube or so-called "twin," which is, in effect, two cubes joined diamond-wise across a corner by a thin unsevered neck or filament of baked material. Such configurations are undesirable and must be sorted out of the product. Actually, only a very small percentage of twins is produced, but it is desirable to eliminate them entirely.

Hence, it is the primary object of the present invention to provide a cube cutting machine which is capable of cutting a baked dough sheet into small cubes at a high rate of speed without producing any "fines" on the one hand or any "twins" on the other.

It is another object of the present invention to provide a form of cutter which will not cut connected cubes or so-called twins.

It is a further object of the present invention to provide cutters of the type stated which can readily and easily be removed, resharpened, and replaced.

With the above and other objects in view, my invention resides in the novel features of form, construction, arrangement, and combination of parts presently described and pointed out in the claim.

In the accompanying drawing—

Figure 1:
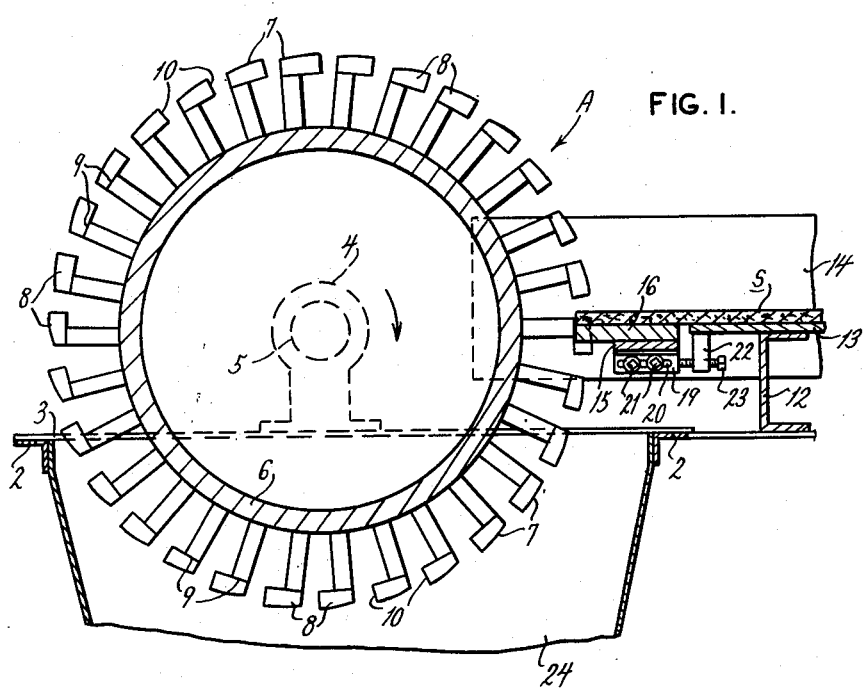
Figure 1 is a vertical sectional view of a cube cutting machine equipped with cutters constructed in accordance with and embodying the present invention.

Referring now in more detail and by reference characters to the drawing, which illustrates a preferred embodiment of the present invention, A designates a cutting machine comprising spaced parallel frame members 2 and cross-plates 3 provided with shaft bearings 4. Journaled in said bearings 4 is a cutter shaft 5 which is suitably driven, as more fully described in my United States Patent No. 2,582,154.

Pinned, keyed, or otherwise rigidly mounted upon the shaft 5 is a cutter cylinder 6 provided with a plurality of radially extending rectangular cutters 7 arranged in spiral formation around the outer peripheral surface of the cylinder 6.

Figure 3:
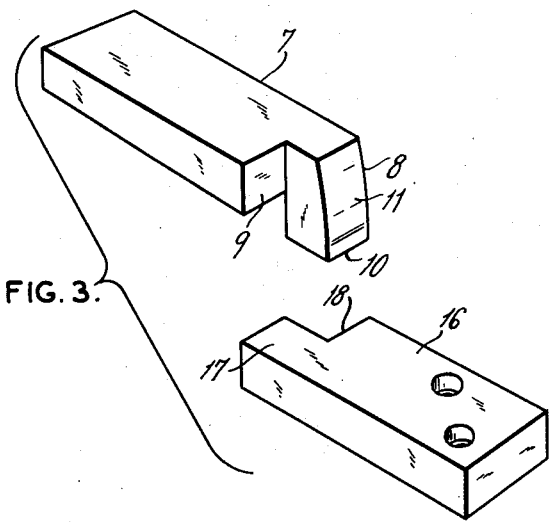
Figure 3 is a perspective view of a single set of cutters in superposed relation.

Each cutter 7 is provided upon its outer end with an outwardly projecting prismatic tooth 8 which extends approximately across half the width of the cutter-tooth, so that the remaining portion of the outer end of the cutter 7 forms a recessed shoulder 9, as best seen in Figure 3. The tooth 8 also projects downwardly in the provision of an advance spur 10 of substantially square cross-sectional shape. It will be noted that the outer or end face 11 of the tooth 8 is beveled back or relieved slightly for the provision of efficient back clearance.

Figure 2:
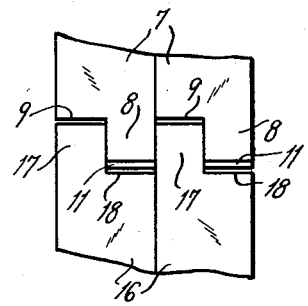
Figure 2 is a fragmentary plan view of the cutters showing interengagement therebetween.

Rigidly secured to the top margin of one frame member 2 by means of a channel 12, and extending horizontally outwardly therefrom in lateral alignment with the cutter cylinder, is a feed plate 13 provided along its side margins with upstanding guide plates 14. Along its transverse inner margin, adjacent the cutter cylinders, the feed plate 13 is provided with a horizontally adjustable stationary cutter bar 15 having a uniformly spaced series of rectangular cutters 16 having projecting rectangular teeth 17 and so-called gullets or inter-tooth spaces 18 for complementary engagement with the teeth 8 of the cutters 7, as best seen in Figures 2 and 3. At its lateral ends, the cutter bar 15 is integrally provided with depending ears 19 having elongated slots 20 for slidably engaging locking bolts 21 mounted in the guide plates 14. Also mounted upon the guide plates 14, just rearwardly of the cutter bar 15, are inwardly projecting bosses 22 threadedly provided with cutter bar adjustment screws 23 which abut at their forward ends against the rear edge of the cutter bar 15. At its rearward transverse margin, the feed plate 13 terminates adjacent the end of a traveling belt conveyor forming a component part of a tunnel-type oven. The conveyor and oven, being conventional, are not shown.

In operation, a dough sheet s, which has been thoroughly baked by passage through the oven at a steady speed upon the belt conveyor, moves out onto and across the feed plate 13 toward the cylinder 6, which is rotating in the direction shown by the arrow in Figure 1, and at a rate of speed in relation to the speed of movement of the baked dough sheet s such that each cutter 7 will make one revolution while the baked dough sheet s moves forward a lineal distance equal to the depth of the gullets 18. As the forward edge of the baked dough sheet s first crosses the cutter bar 15, the spur 10 will bite irregular pieces out of the uneven margin of the dough sheet s. However, as soon as the initial portion has been cut away and the baked dough sheet s is "squared off," so to speak, the cutters 7 will continue thereafter to punch out cleanly cubed pieces of baked dough. The spur 10 of each cutter 7 will complete its cut before the shoulder 9 begins cutting.

It should be noted that, due to the spiral arrangement of the cutters 7 around the cutter cylinder 6, only two symmetrically placed cutters will be in cutting engagement with the baked dough sheet s at a time. Furthermore, the progression of tooth engagement is outwardly in both directions from the center, so that the tendency for transverse buckling in the baked dough sheet s is overcome. It will be apparent that the spaces between the teeth 8 will act as gullets for the teeth 17 on the cutter bar 15, so that the teeth 17 will cut off the intermediate portions of baked dough left uncut by the teeth 8 and thus an entire section across the whole width of the dough sheet s will be cut into uniform cubes upon a single revolution of the cylinder 6. The cubes of baked dough thus formed will drop through the hopper 14 for transportation to subsequent handling apparatus (not shown).

It should be understood that changes and modifications in the form, construction, arrangement, and combination of the several parts of the cube cutting machine and cutters therefor may be made and substituted for those herein shown and described without departing from the nature and principle of my invention.

Having thus described my invention, what I claim and desire to secure by Letters Patent is:

A cube cutting machine comprising, in combination, a stationary cutter-bar having a plurality of uniformly spaced straight teeth, a rotatable cylinder, elongated cutters radially projecting from the peripheral surface of said cylinder in staggered formation, each of said cutters having a stepped outer end sized to pass between two adjacent straight teeth, and a forwardly projecting spur for engaging the material to be cut in advance of the remainder of the cutter.

CLARENCE A. PAPENDICK.

References Cited in the file of this patent

UNITED STATES PATENTS

| Number | Name | Date |
| --- | --- | --- |
| 327,885 | Le Clair | Oct. 6, 1885 |
| 438,198 | Spangler | Oct. 14, 1890 |
| 649,985 | Hall | May 22, 1900 |
| 823,672 | Dobbs et al. | June 19, 1906 |
| 864,552 | Perkins | Aug. 27, 1907 |
| 2,573,887 | Assland | Nov. 6, 1951 |
| 2,582,154 | Papendick | Jan. 8, 1952 |